US011592926B2

(12) United States Patent
Tate, II et al.

(10) Patent No.: US 11,592,926 B2
(45) Date of Patent: Feb. 28, 2023

(54) ESTABLISHING WIRELESS PAIRING VIA ELECTROSTATIC INTERFACE USING TEMPORARY KEY

(71) Applicant: Microsoft Technology Licensing, LLC, Redmond, WA (US)

(72) Inventors: Sylvester Tate, II, Memphis, TN (US); Frank Gorgenyi, Bremerton, WA (US); Arie Yehuda Gur, Kiryat Ono (IL); Uri Ron, Kfar Saba (IL); Rahul Ramadas, Bellevue, WA (US); Sebastian Perez Juarez, Bellevue, WA (US); J Robert Sims, III, Fort Collins, CO (US); Jay Gilbert, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/448,197

(22) Filed: Sep. 20, 2021

(65) Prior Publication Data

US 2023/0021881 A1 Jan. 26, 2023

Related U.S. Application Data

(60) Provisional application No. 63/221,532, filed on Jul. 14, 2021.

(51) Int. Cl.
*G06F 3/041* (2006.01)
*G06F 3/044* (2006.01)
(Continued)

(52) U.S. Cl.
CPC .......... *G06F 3/04162* (2019.05); *G06F 3/016* (2013.01); *G06F 3/038* (2013.01);
(Continued)

(58) Field of Classification Search
CPC ........................ G06F 3/04162; G06F 3/0441
See application file for complete search history.

(56) References Cited

U.S. PATENT DOCUMENTS 9,448,646 B1 9/2016 Yamamoto et al.
9,699,653 B2 7/2017 Macduff et al.
(Continued)

FOREIGN PATENT DOCUMENTS

| JP | 6644179 B2 | 1/2020 |
| KR | 20160069924 A | 6/2016 |
| KR | 20180089640 A | 8/2018 |

OTHER PUBLICATIONS

Ren, Kai, "Bluetooth Pairing Part 5: Legacy Pairing—Out of Band", Retrieved from: https://www.bluetooth.com/blog/bluetooth-pairing-part-5-legacy-pairing-out-of-band/, Apr. 7, 2017, 4 Pages.
(Continued)

*Primary Examiner* — Chun-Nan Lin
(74) *Attorney, Agent, or Firm* — Alleman Hall Creasman & Tuttle LLP

(57) ABSTRACT

A computing device including a wireless communication device, an electrostatic interface, and a processor. The processor may be configured to, via the electrostatic interface, detect a peripheral device proximate the surface. In response to detecting the peripheral device, the processor may be further configured to establish wireless pairing with the peripheral device at least in part by performing an identifier exchange via the electrostatic interface. Subsequently to performing the identifier exchange, establishing wireless pairing may further include generating a temporary key and transmitting the temporary key to the peripheral device via the electrostatic interface. Subsequently to transmitting the temporary key, establishing wireless pairing may further include receiving a first wireless pairing signal from the peripheral device via the wireless communication
(Continued)

device. Subsequently to receiving the first wireless pairing signal, establishing wireless pairing may further include transmitting a second wireless pairing signal to the peripheral device via the wireless communication device.

16 Claims, 10 Drawing Sheets

(51) Int. Cl.
  *G06F 3/038* (2013.01)
  *G06F 3/01* (2006.01)
  *G06F 3/0354* (2013.01)

(52) U.S. Cl.
  CPC ........ *G06F 3/03545* (2013.01); *G06F 3/0441* (2019.05); *G06F 3/0442* (2019.05); *G06F 2203/0384* (2013.01)

(56) References Cited

U.S. PATENT DOCUMENTS

| | | |
|---|---|---|
| 9,898,102 B2 | 2/2018 | Qiao |
| 9,916,022 B2 | 2/2018 | Qiao |
| 9,924,019 B2 | 3/2018 | Jeganathan et al. |
| 10,254,857 B2 | 4/2019 | Winebrand et al. |
| 10,444,927 B2 | 10/2019 | Westhues et al. |
| 10,514,803 B2 | 12/2019 | Zyskind |
| 10,659,589 B2 | 5/2020 | Jeganathan et al. |
| 10,719,148 B2 | 7/2020 | Gilbert et al. |
| 2017/0153763 A1 | 6/2017 | Vavra et al. |
| 2017/0262084 A1* | 9/2017 | Qiao ..................... H04W 4/80 |
| 2018/0129311 A1* | 5/2018 | Westhues ............ G06F 3/04162 |
| 2020/0019255 A1* | 1/2020 | Gilbert ................. H04W 12/06 |
| 2020/0081560 A1 | 3/2020 | Geller et al. |

OTHER PUBLICATIONS

"International Search Report and Written Opinion Issued in PCT Application No. PCT/US22/031500", dated Sep. 12, 2022, 10 Pages.

* cited by examiner

ESTABLISHING WIRELESS PAIRING VIA ELECTROSTATIC INTERFACE USING TEMPORARY KEY

CROSS REFERENCE TO RELATED APPLICATIONS

This application claims priority to U.S. Provisional Patent Application No. 63/221,532, filed Jul. 14, 2021, the entirety of which is hereby incorporated herein by reference for all purposes.

BACKGROUND

Computing devices are sometimes used with peripheral devices that have onboard computing capabilities with which additional functionality is provided. In order to provide such additional functionality, the peripheral device may be paired with the computing device such that the computing device and the peripheral device are registered with each other as eligible sources and recipients of input and output communications. The computing device and the peripheral device may communicate via a wireless connection when they have been paired. The wireless connection may be an encrypted connection. For example, the pairing between the computing device and the peripheral device may be a BLUETOOTH pairing, and the computing device and the peripheral device may communicate using the BLUETOOTH protocol.

SUMMARY

According to one aspect of the present disclosure, a computing device is provided, including a wireless communication device, an electrostatic interface located on a surface of the computing device, and a processor. The processor may be configured to, via the electrostatic interface, detect a peripheral device proximate the surface. In response to detecting the peripheral device, the processor may be further configured to establish wireless pairing with the peripheral device at least in part by performing an identifier exchange with the peripheral device via the electrostatic interface. Subsequently to performing the identifier exchange, establishing wireless pairing with the peripheral device may further include generating a temporary key. Establishing wireless pairing with the peripheral device may further include transmitting the temporary key to the peripheral device via the electrostatic interface. Subsequently to transmitting the temporary key to the peripheral device, establishing wireless pairing with the peripheral device may further include receiving a first wireless pairing signal from the peripheral device via the wireless communication device. Subsequently to receiving the first wireless pairing signal, establishing wireless pairing with the peripheral device may further include transmitting a second wireless pairing signal to the peripheral device via the wireless communication device to thereby create a bonded device pair including the computing device and the peripheral device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In one type of computing system, there are peripheral devices that are usable without pairing but have additional functionality that is enabled when paired with a respective computing device. For example, a pen that has onboard computing and wireless communication capabilities may be used to make touch inputs at a touch-sensitive input device without pairing the pen with the computing device that includes the touch-sensitive input device. When the pen is paired with the computing device, a wireless connection between the pen and the computing device may be established. A user may make additional inputs and receive additional outputs at the pen that are communicated to and received from the computing device over the wireless connection. Accordingly, pairing the pen with the computing device may enhance the user's ability to interact with the computing device via the pen, beyond merely using the pen to make touch inputs at the touch-sensitive input device.

One frequent barrier to the use of a peripheral device with a computing device is the setup process by which the computing device and the peripheral device are paired. In instances in which the setup process is time-consuming or requires the user to navigate a setup menu, users may be disinclined to pair the computing device with the peripheral device. Users who do not complete this process may therefore be unable to access the full range of functionality that would be made available by pairing the computing device with the peripheral device. Accordingly, a technical challenge exists for improving the pairing process, to make pairing a faster and more seamless experience for users.

Figure 1:
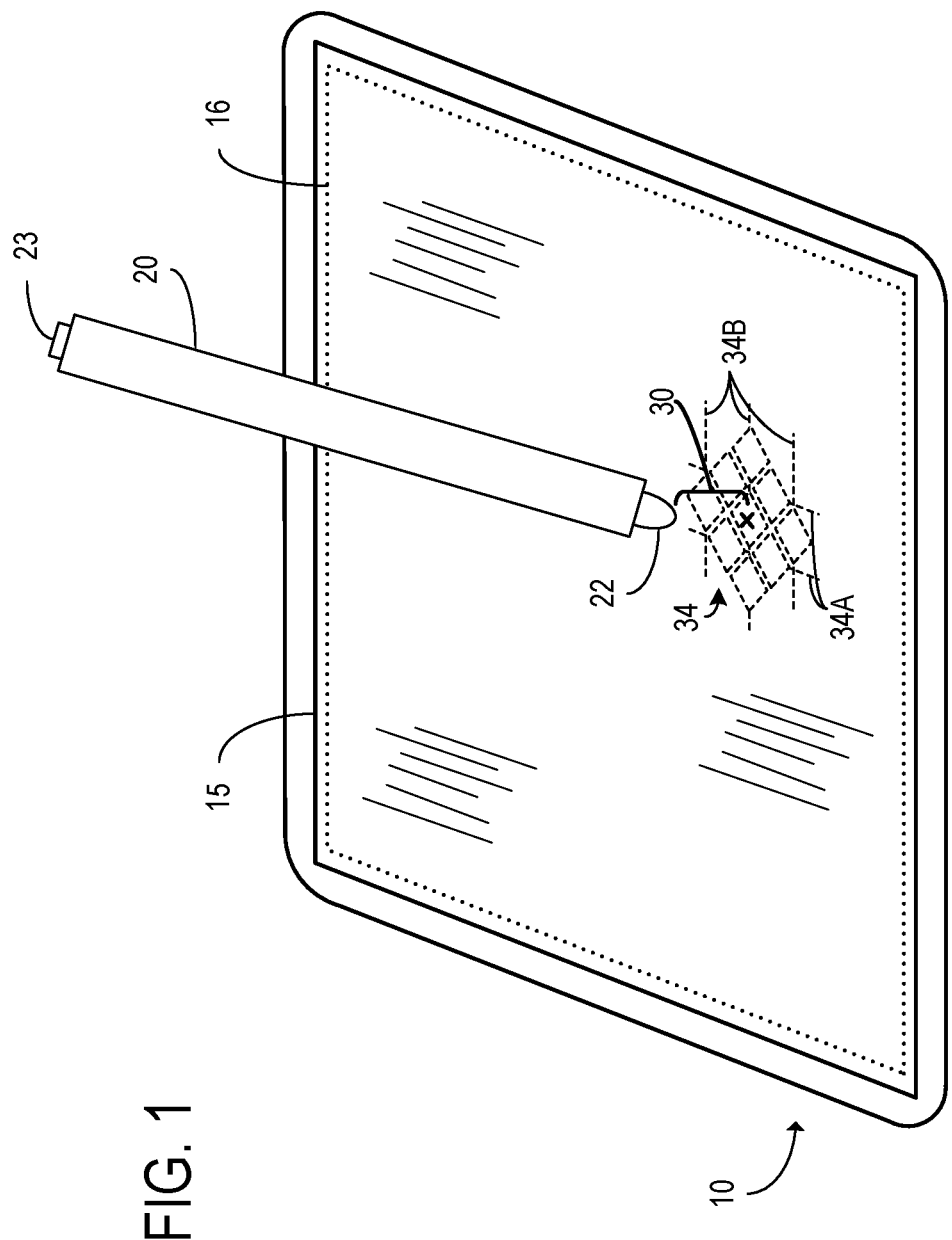
FIG. 1 shows an example computing device that is configured to be used with a peripheral device, according to one example embodiment.

FIG. 1 shows an example computing device 10 that is configured to be used with a peripheral device 20. In the example of FIG. 1, the computing device 10 is a tablet computing device and the peripheral device 20 is a pen. The computing device shown in the example of FIG. 1 includes a touch-sensitive user input device in the form of an electrostatic interface 16 located on a surface 15 of the computing device 10. The electrostatic interface 16 may be configured to perform capacitive touch input sensing to detect touch inputs made at the surface 15. A user of the computing device 10 may make the touch inputs at the surface 15 using the peripheral device 20. Additionally or alternatively, touch inputs may be made via the user's finger or by some other method.

When a touch input is made via the peripheral device 20, the electrostatic interface 16 may detect that the peripheral device 20 is located proximate the surface 15. The touch input may be a direct touch input in which the peripheral device 20 contacts the surface 15. Alternatively, the touch input may be a proximity touch input in which the peripheral device 20 hovers over the surface 15 but is not in direct contact with the surface. The electrostatic interface 16 may, for example, detect a proximity touch input when the peripheral device 20 is within a predetermined distance 30 (e.g. one inch) of the surface 15.

In the example of FIG. 1, the peripheral device 20 includes a pen tip 22, which may have a surface formed at least in part of an electrically conductive material. Thus, electrical signals may be transmitted through the pen tip 22 between the peripheral device 20 and the electrostatic interface 16 of the computing device 10. Such electrical signals may be transmitted from the computing device 10 to the peripheral device 20 or from the peripheral device 20 to the computing device 10. Thus, the pen tip 22 may function as an electrode. The peripheral device shown in the example of FIG. 1 further includes a tail button 23 which the user may press in order to provide user input.

Figure 2:
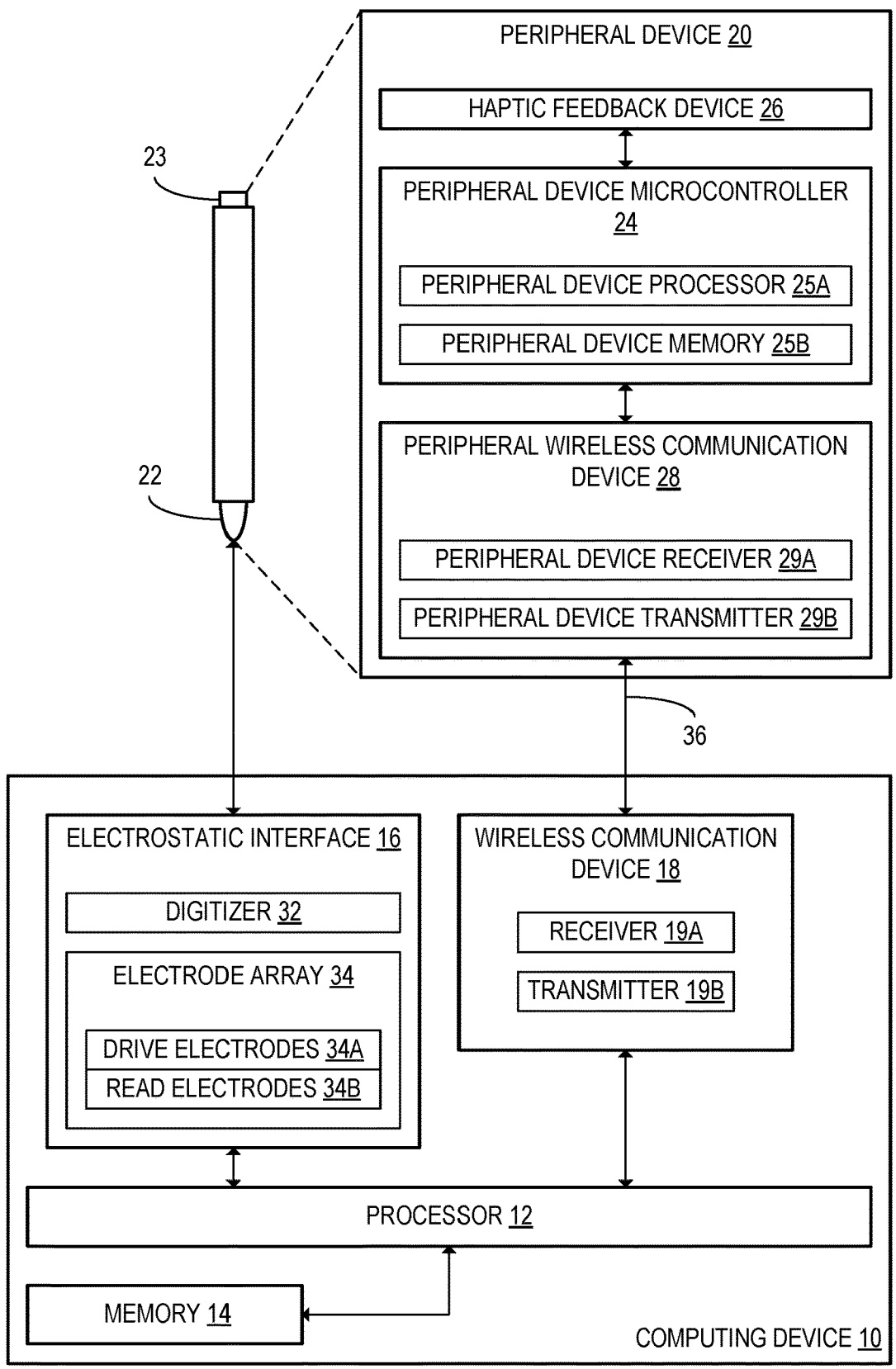
FIG. 2 schematically depicts the computing device and the peripheral device, according to the example of FIG. 1.

FIG. 2 schematically depicts components of the computing device 10 and the peripheral device 20 of FIG. 1 in additional detail. As shown in FIG. 2, the computing device 10 may include a processor 12, memory 14, the electrostatic interface 16, and a wireless communication device 18. The processor 12 may, for example, include a central processing unit (CPU), a graphical processing unit (GPU), and/or a system-on-a-chip (SoC). Other types of processing device may additionally or alternatively be included in the computing device 10.

The memory 14 may, for example, include volatile memory and/or non-volatile storage. In examples in which the computing device 10 includes an SoC, the SoC may, for example, include components configured to perform the functions of the processor 12 and the memory 14.

The electrostatic interface 16, as shown in the example of FIG. 2, may include a digitizer 32 that is configured to convert capacitive touch input signals into digital inputs such that computational processes may be applied to the capacitive touch input signals at the processor 12. The digitizer 32 may be configured to receive signals from a capacitive touch sensor including an electrode array 34. The electrode array 34 may include drive electrodes 34A and read electrodes 34B arranged substantially perpendicularly to each and forming rows and columns in the array, as shown in FIG. 1. The capacitive touch sensor may be configured to sequentially cycle driving current through the drive electrodes 34A and read the measured capacitance at the read electrodes 34B. When the peripheral (or a user's digit) touches or hovers near the touch screen, the measured capacitance in the read electrodes 34B of the electrode array 34 may change. In this way, the location of the touch or hover position of the peripheral (or a user's digit) can be detected. The digitizer 32 may be configured to read the measured capacitances from the capacitive touch sensor and convert them into a capacitive touch map in digital form. The capacitive touch map may indicate respective capacitance values at each of a plurality of pixels in the map.

In addition to the above touch sensing function, by supplying modulated driving voltage to the drive electrodes 34A modulated electrical signals encoding data may be sent to the peripheral device 20 from the computing device via the electrostatic interface 16. The modulated driving voltage may be transmitted to the drive electrodes 34A at a time during the digitizer cycle that is not used to measure capacitance, referred to as an uplink period. The peripheral device 20 may be configured to detect the electrical signals during this uplink period.

In the example of FIG. 1, the electrostatic interface 16 is provided on a touchscreen that is configured to display graphical output. It will be appreciated that in other examples, the electrostatic interface may be provided on a touch pad, for example, that does not include a display.

In some examples, in addition to the electrostatic interface 16, the computing device 10 may further include one or more other input devices and/or one or more other output devices. For example, the computing device 10 may further include one or more buttons, one or more microphones, one or more accelerometers, one or more optical sensors, and/or one or more of some other type of input device. Additionally or alternatively, the computing device 10 may further include one or more additional displays, one or more speakers, one or more haptic feedback devices, and/or one or more of some other type of output device.

The wireless communication device 18 may include a receiver 19A and a transmitter 19B. Via the receiver 19A, the computing device 10 may be configured to receive wireless signals from the peripheral device 20, and via the transmitter 19B, the computing device 10 may be configured to transmit wireless signals to the peripheral device 20. In some examples, the computing device 10 may be configured to communicate with one or more other computing devices using the wireless communication device 18. For example, the computing device 10 may be a client computing device that is configured to communicate with one or more server computing devices over a network. In some examples, the computing device 10 may be further configured to communicate with one or more other computing devices over a wired connection.

Components of the example peripheral device 20 of FIG. 1 are also schematically depicted in FIG. 2. As discussed above, the peripheral device may include a pen tip 22 and a tail button 23 that may be used as input devices. Other input devices not shown in FIG. 2 may also be included in the peripheral device 20 in some examples, such as one or more additional buttons, one or more switches, one or more optical sensors, one or more microphones, one or more accelerometers, and/or one or more of some other type of sensor.

The peripheral device 20 of FIG. 2 may further include a peripheral device microcontroller 24. The peripheral device microcontroller 24 may include a peripheral device processor 25A and peripheral device memory 25B. The peripheral device microcontroller 24 may be electrically coupled to the pen tip 22, the tail button 23, and, in some examples, to one or more other input devices included in the peripheral device 20.

In some examples, the peripheral device 20 may further include a haptic feedback device 26 that is electrically coupled to the peripheral device microcontroller 24 and is configured to produce tactile outputs. The peripheral device 20 may, in some examples, include one or more other output devices not shown in FIG. 2, which may also be electrically coupled to the peripheral device microcontroller 24.

As shown in the example of FIG. 2, the peripheral device 20 may further include a peripheral wireless communication device 28, which may include a peripheral device receiver 29A and a peripheral device transmitter 29B. The peripheral wireless communication device 28 may be electrically coupled to the peripheral device microcontroller 24 and may be configured to communicate with the computing device 10 via the wireless communication device 18 of the computing device 10.

Figure 3:
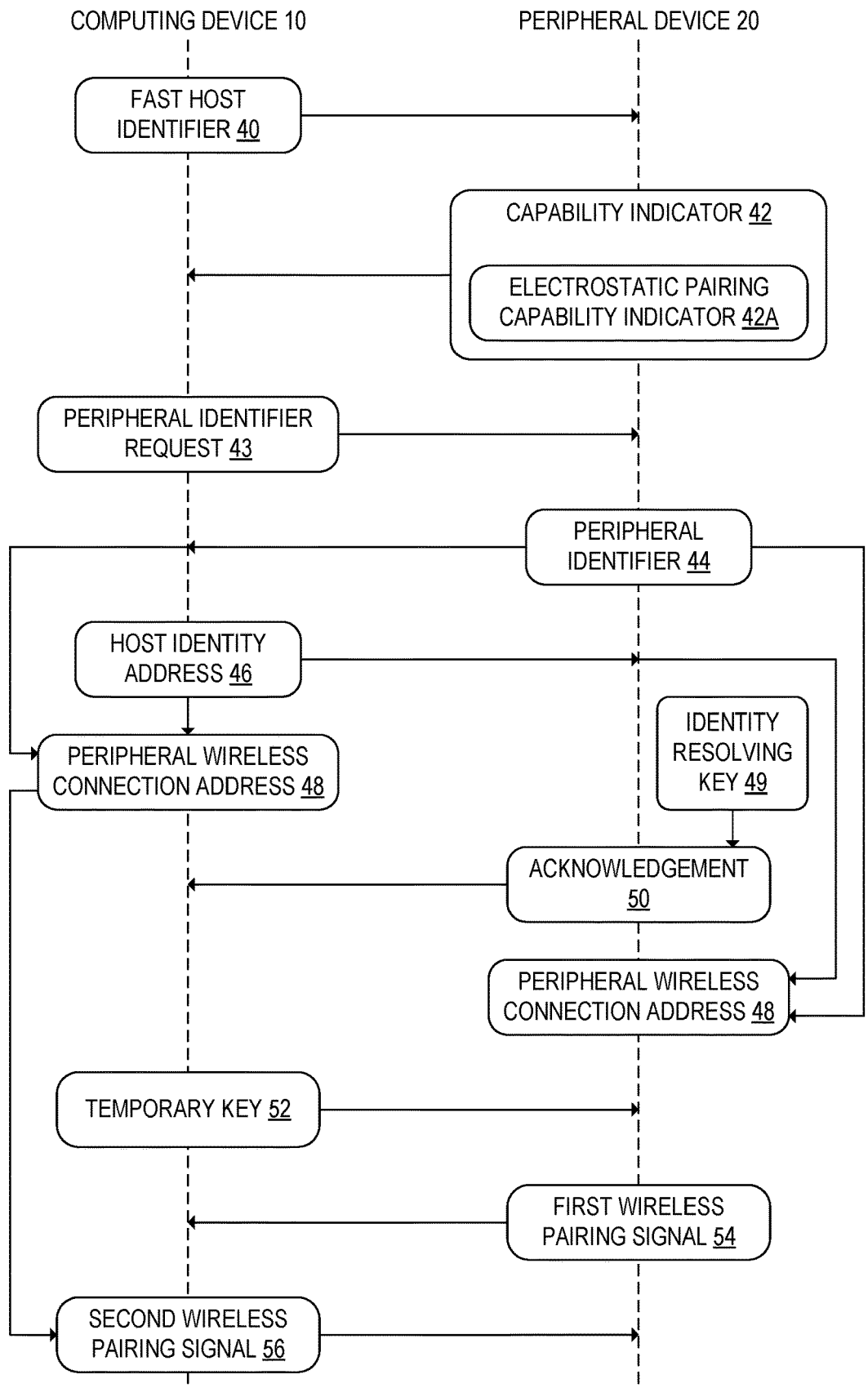
FIG. 3 schematically depicts information exchanged between the computing device and the peripheral device when a wireless pairing is established, according to the example of FIG. 1.

The computing device 10 and the peripheral device 20 are shown in FIG. 2 as having a wireless pairing 36 over which the computing device 10 and the peripheral device 20 are configured to wirelessly exchange information. In response to detecting the peripheral device 20 when the peripheral device 20 makes a touch input at the electrostatic interface 16, the processor 12 of the computing device 10 may be configured to establish the wireless pairing 36 as discussed below. FIG. 3 schematically depicts information exchanged between the computing device 10 and the peripheral device 20 when the wireless pairing 36 is established. The information exchanged between the computing device 10 and the peripheral device 20 may be processed at the processor 12 of the computing device 10 and the peripheral device processor 25A included in the peripheral device microcontroller 24 of the peripheral device 20.

Establishing the wireless pairing 36 between the computing device 10 and the peripheral device 20 may include, at the processor 12 of the computing device 10, performing an identifier exchange with the peripheral device 20 via the electrostatic interface 16. In some examples, the identifier exchange may include transmitting a fast host identifier (FHID) 40 to the peripheral device via the electrostatic interface 16. The FHID 40 may, for example, be an indicator of one or more hardware capabilities of the computing device 10 and may indicate that the computing device 10 is configured with electrostatic pairing capabilities. In some examples, the FHID 40 may be a byte array of two bytes. In response to transmitting the FHID 40 to the peripheral device, the identifier exchange may further include receiving a capability indicator 42 from the peripheral device 20 via the electrostatic interface 16. The capability indicator 42 may include an electrostatic pairing capability indicator 42A that indicates that the peripheral device 20 has an electrostatic-pairing-eligible hardware configuration. Thus, by exchanging the FHID 40 and the capability indicator 42, the processor 12 and the peripheral device processor 25A may be configured to determine that the computing device 10 and the peripheral device 20 are eligible to establish the wireless pairing 36 at least in part by exchanging pairing information through the electrostatic interface 16. Receiving the capability indicator 42 from the peripheral device 20 may have the technical benefit of allowing the processor 12 to determine whether the peripheral device 20 is capable of wireless pairing before attempting to establish the wireless pairing 36.

The identifier exchange may further include transmitting a peripheral identifier request 43 to the peripheral device 20 via the electrostatic interface 16. In examples in which an FHID 40 and a capability indicator 42 are exchanged, the processor 12 may be configured to transmit the peripheral identifier request 43 to the peripheral device 20 in response to receiving the electrostatic pairing capability indicator 42A. In response to transmitting the peripheral identifier request 43 to the peripheral device 20, the identifier exchange may further include receiving a peripheral identifier (PID) 44 at the processor 12 from the peripheral device 20 via the electrostatic interface 16. In some examples, the processor 12 may be configured to transmit the peripheral identifier request 43 and receive the PID 44 prior to transmitting the FHID 40 to the peripheral device 20. Additionally or alternatively, in some examples, the processor 12 may be configured to transmit the FHID 40 to the peripheral device 20 and receive the PID 44 from the peripheral device 20 in parallel. Transmitting the peripheral identifier request 43 to and receiving the PID 44 from the peripheral device 20 may have the technical advantage of allowing the processor 12 to distinguish between peripheral devices in examples in which multiple peripheral devices 20 are used with the computing device 10.

The identifier exchange may further include transmitting a host identity address (HIA) 46 to the peripheral device 20 via the electrostatic interface 16. The HIA may be used at the peripheral device 20 to distinguish between different computing devices 10 in examples in which the peripheral device 20 is used with a plurality of computing devices 10. In some examples, the identifier exchange may further include receiving an acknowledgement 50 from the peripheral device 20 via the electrostatic interface 16 in response to transmitting the HIA 46 to the peripheral device 20. Thus, the peripheral device processor 25A of the peripheral device 20 may be configured to acknowledge that it has received the HIA 46 from the processor 12 of the computing device 10. In some examples, the acknowledgement 50 may further indicate whether the HIA 46 of the computing device 10 is already registered in the peripheral device memory 25B of the peripheral device 20. When the acknowledgement 50 indicates that the HIA 46 is already registered with the peripheral device 20, the processor 12 may be configured to end the process of establishing the wireless pairing 36. Otherwise, the processor 12 may be configured to continue establishing the wireless pairing 36 as discussed below.

In some examples, an identity resolving key (IRK) 49 may be stored in the peripheral device memory 25B of the peripheral device 20. In such examples, the peripheral device processor 25A may be configured to determine whether the HIA 46 is already registered with the peripheral device 20 based at least in part on the IRK 49. The peripheral device processor 25A may be configured to generate the IRK 49 when the HIA 46 of a computing device 10 is received and may be further configured to refer to the IRK 49 during one or more subsequent attempts to pair the peripheral device 20 with one or more computing devices 10. The peripheral device processor 25A may be configured to generate the acknowledgement 50 based at least in part on the IRK 49. Thus, the peripheral device 20 may be configured to determine whether it already has a wireless pairing 36 with a computing device 10 when the computing device 10 and the peripheral device 20 perform an identifier exchange.

Establishing the wireless pairing 36 may further include, at the processor 12, determining a peripheral wireless connection address 48 for the peripheral device 20. The peripheral wireless connection address 48 may be determined based at least in part on the PID 44 and at least in part on the HIA 46. Thus, the peripheral wireless connection address 48 may be unique with respect to the wireless pairing 36 between the computing device 10 and the peripheral device 20. A unique peripheral wireless connection address 48 may have the technical benefit of allowing the processor 12 to distinguish between different peripheral devices 20 when a plurality of peripheral devices 20 are wirelessly connected to the computing device 10. In some examples, the peripheral device processor 25A may also be configured to compute the peripheral wireless connection address 48 based at least in part on the PID 44 and the HIA 46.

Establishing the wireless pairing 36 may further include generating a temporary key 52 at the processor 12 subsequently to performing the identifier exchange. In some examples, the temporary key 52 may be generated in response to receiving the acknowledgement 50. The temporary key 52 may, for example, be a single-use 128-bit key. Using a temporary key 52 rather than a permanent key may save storage space in the memory 14 that would otherwise continue to store the key after establishing the wireless pairing 36, and may offer security advantages. Establishing the wireless pairing 36 may further include transmitting the temporary key 52 to the peripheral device 20 via the electrostatic interface 16.

The peripheral device processor 25A may be configured to initiate pairing over a wireless connection when the temporary key 52 is received. The peripheral device processor 25A may be configured to transmit a first wireless pairing signal 54 to the computing device 10 via the peripheral wireless communication device 28. The first wireless pairing signal 54 may, for example, be a BLUETOOTH signal with a frequency between 2.400 GHz and 2.4835 GHz. Alternatively, some other wireless communication protocol may be used for the first wireless pairing signal 54. The first wireless pairing signal 54 may be encrypted with the temporary key 52.

At the processor 12 of the computing device 10, subsequently to transmitting the temporary key 52 to the peripheral device 20, establishing the wireless pairing 36 may further include receiving the first wireless pairing signal 54 from the peripheral device 20 via the wireless communication device 18. In examples in which the first wireless pairing signal 54 is encrypted with the temporary key 52, the processor 12 may be further configured to use the temporary key 52 to decrypt the first wireless pairing signal 54.

In examples in which the peripheral device processor 25A is configured to compute the peripheral wireless connection address 48, the peripheral wireless connection address 48 may be included in the first wireless pairing signal 54. Thus, in examples in which multiple peripheral devices 20 are used with the computing device 10, the first wireless pairing signal 54 may indicate which of the peripheral devices 20 is transmitting the first wireless pairing signal 54.

Subsequently to receiving the first wireless pairing signal 54, establishing the wireless pairing 36 may further include, at the processor 12, transmitting a second wireless pairing signal 56 to the peripheral device 20 via the wireless communication device 18. Thus, the processor 12 may be configured to create a bonded device pair including the computing device 10 and the peripheral device 20. In examples in which the processor 12 is configured to determine a peripheral wireless connection address 48 for the peripheral device 20, the second wireless pairing signal 56 may be transmitted to the peripheral device 20 as specified by the peripheral wireless connection address 48. The second wireless pairing signal 56 may encode a long-term key that may be used to encrypt future communications between the computing device 10 and the peripheral device 20. By transmitting the second wireless pairing signal 56 to the peripheral device 20 subsequently to receiving the first wireless pairing signal 54, the computing device 10 may, in examples in which the first wireless pairing signal 54 is encrypted with the temporary key, confirm that it has a copy of the temporary key 52. Thus, in examples in which the peripheral device 20 is used with a plurality of different computing devices 10, the computing device 10 may confirm that the peripheral device 20 is establishing the wireless pairing 36 with the correct computing device 10.

Figure 4:
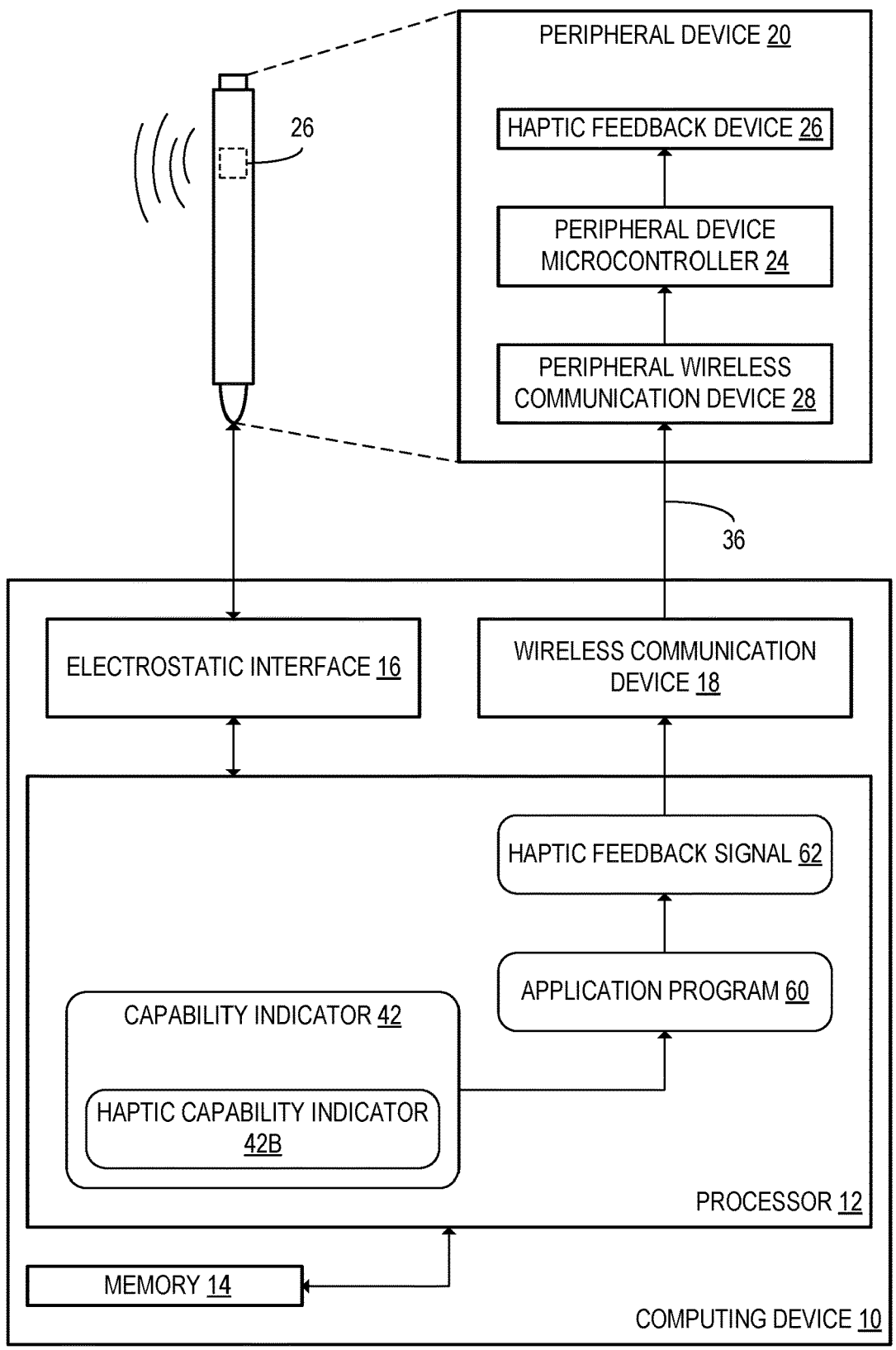
FIG. 4 schematically depicts the computing device and the peripheral device when the computing device is configured to output a haptic feedback signal to the peripheral device, according to the example of FIG. 1.

Turning now to FIG. 4, the capability indicator 42 may further indicate, in some examples, that the peripheral device 20 includes a haptic feedback device 26. As depicted in the example of FIG. 4, the capability indicator 42 may include a haptic capability indicator 42B indicating that the peripheral device 20 is configured to output haptic feedback. In some examples, the processor 12 may be configured to enable haptic feedback via the peripheral device 20 by establishing the wireless pairing 36 with the peripheral device 20. In such examples, subsequently to establishing the wireless pairing 36 with the peripheral device 20, the processor 12 may be further configured to transmit a haptic feedback signal 62 to the peripheral device 20 via the wireless communication device 18. For example, the haptic feedback signal 62 may be generated at an application program 60 executed at the processor 12. The application program 60 may be configured to receive the haptic capability indicator 42B and may be configured to output the haptic feedback signal 62 when the haptic capability indicator 42B indicates that the peripheral device 20 has haptic feedback capabilities. When the peripheral device 20 receives the haptic feedback signal 62 at the peripheral device microcontroller 24 via the peripheral wireless communication device 28, the peripheral device processor 25A may be configured to transmit the haptic feedback signal 62 to the haptic feedback device 26 for output. Haptic feedback may enhance the user experience for the user of the peripheral device 20. Thus, in examples in which wireless pairing enables haptic feedback, using the electrostatic interface 16 to more easily establish the wireless pairing 36 may have the technical benefit of allowing the user experience to be enhanced via haptic feedback more easily.

Figure 5:
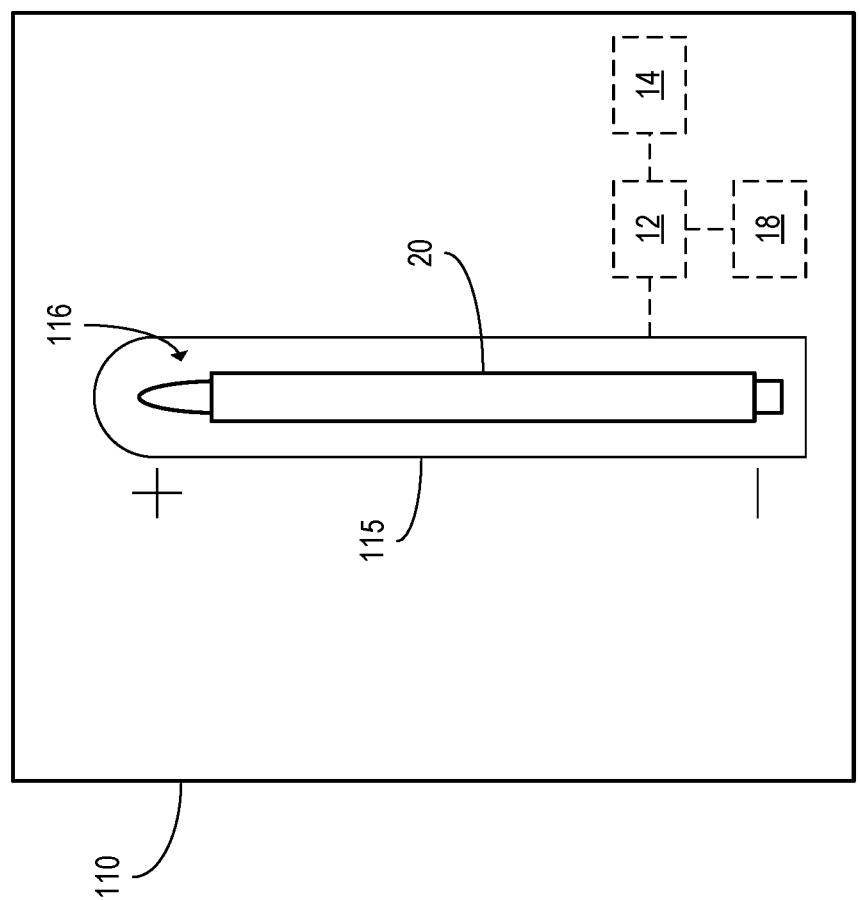
FIG. 5 schematically shows an example computing device including an electrostatic interface provided in a charging dock.

In some examples, the peripheral device 20 may be configured to establish a wireless pairing 36 with computing devices other than touch-sensitive display devices. FIG. 5 schematically shows another example computing device 110 in which the electrostatic interface 116 is included in a charging dock 115. The charging dock 115 may be an inductive charging dock configured to charge a battery included in the peripheral device 20 via electromagnetic induction. When the peripheral device 20 is docked in the charging dock 115, the processor 12 of the computing device 110 may be configured to establish a wireless pairing 36 with the peripheral device 20 via the electrostatic interface 116 located on the surface of the charging dock 115. Thus, establishing the wireless pairing 36 using an electrostatic interface 16, as discussed above, may allow the user to easily pair the peripheral device 20 with a wider range of devices compared to previous pairing methods.

Figure 6:
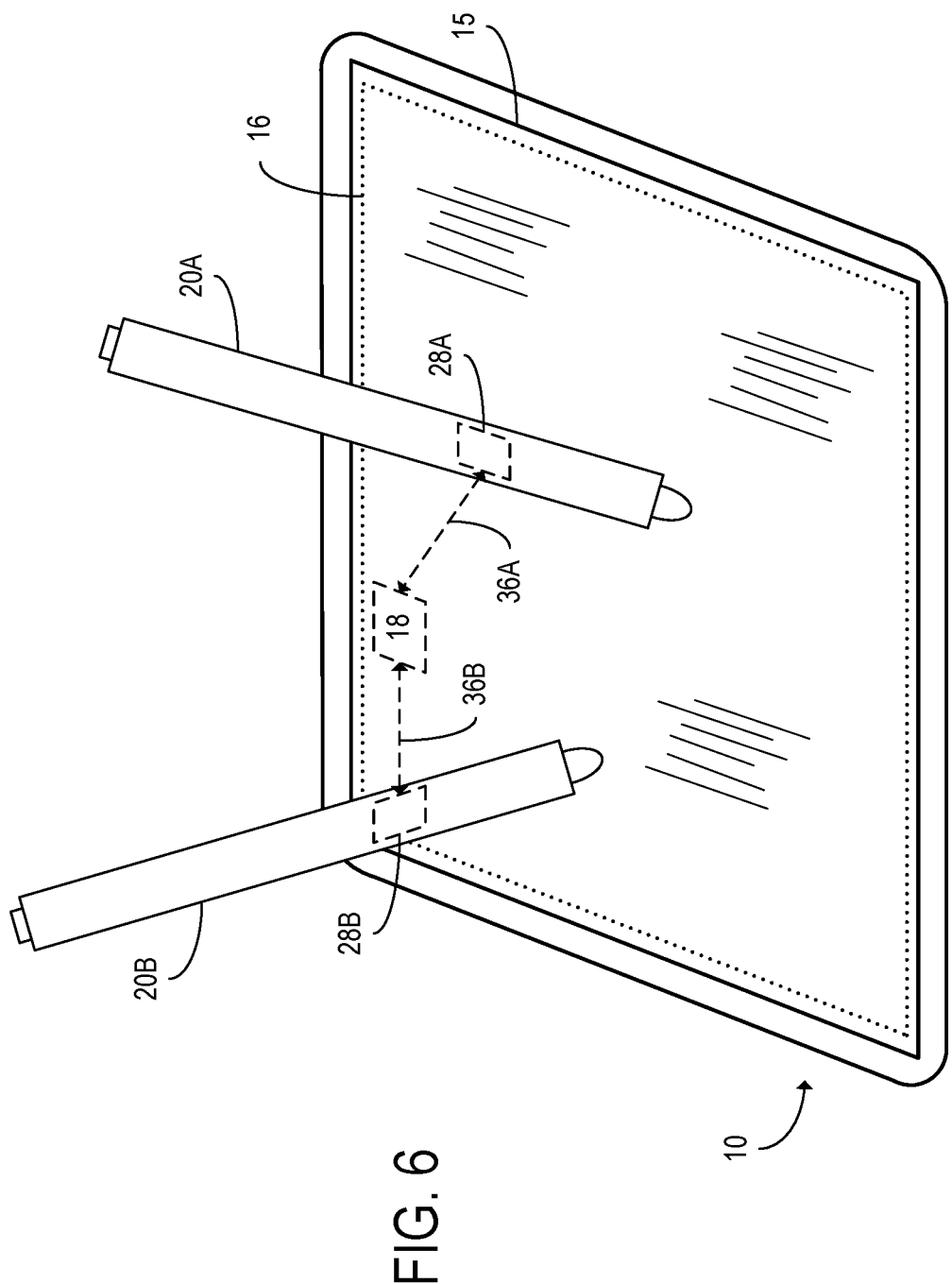
FIG. 6 shows the computing device when the computing device is concurrently paired with a first peripheral device and a second peripheral device, according to the example of FIG. 1.

In some examples, as shown in FIG. 6, multiple peripheral devices may be paired with a computing device 10. FIG. 6 shows a first peripheral device 20A and a second peripheral device 20B that are both paired with the computing device 10. The first peripheral device 20A is paired with the computing device 10 in a first wireless pairing 36A between the wireless communication device 18 of the computing device 10 and a first peripheral wireless communication device 28A of the first peripheral device 20A. The second peripheral device 20B is paired with the computing device 10 in a second wireless pairing 36B between the wireless communication device 18 of the computing device 10 and a second peripheral wireless communication device 28B of the second peripheral device 20B. The processor 12 may be configured to receive respective PIDs 44 from the first peripheral device 20A and the second peripheral device 20B and may be further configured to determine corresponding peripheral wireless connection addresses 48 for the first peripheral device 20A and the second peripheral device 20B. When establishing the first wireless pairing 36A and the second wireless pairing 36B, the processor 12 may be configured to receive respective first wireless pairing signals 54 from, and transmit respective second wireless pairing signals 56 to, the first peripheral device 20A and the second peripheral device 20B.

Figure 7A:
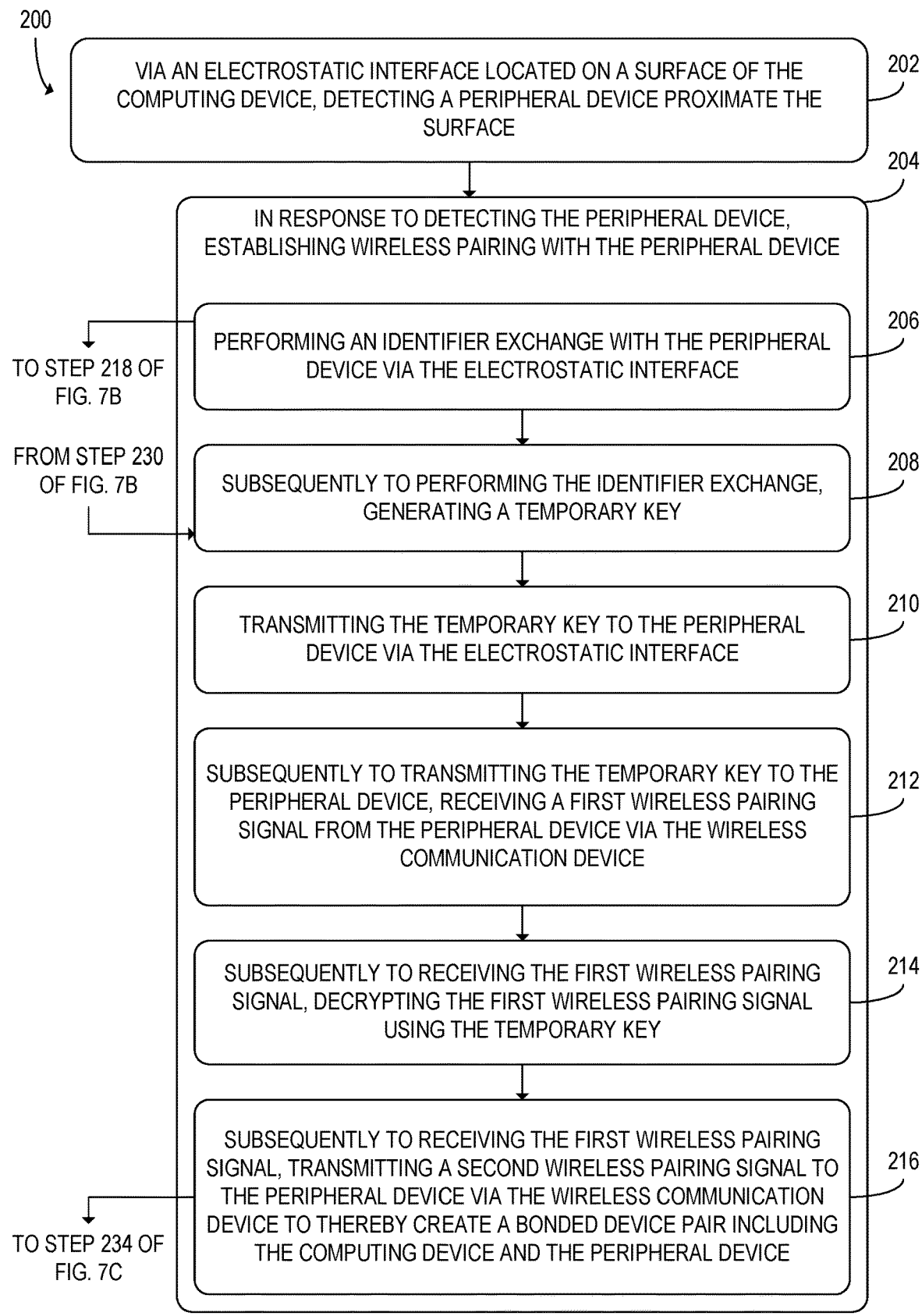
FIG. 7A shows a flowchart of a method for use with a computing device to establish a wireless pairing with a peripheral device, according to the example of FIG. 1.

FIG. 7A shows a flowchart of a method 200 for use with a computing device to establish wireless pairing between the computing device and a peripheral device. For example, the peripheral device may be a pen with onboard computing capabilities. At step 202, the method 200 may include, via an electrostatic interface located on a surface of the computing device, detecting a peripheral device proximate the surface. For example, the electrostatic interface may be included in a touch-sensitive user input device included in the computing device. Alternatively, the electrostatic interface may be included in a charging dock included in the computing device. The peripheral device may be detected as being proximate the surface when, for example, the peripheral device is within a predetermined distance of the surface, such as a non-zero distance of up to 1 inch. The computing device may be calibrated to detect the peripheral device hovering at the predetermined distance based upon characteristics of the capacitive shadow emitted by the peripheral device on a capacitive sensor of the electrostatic interface when positioned at the predetermined distance.

At step 204, the method 200 may further include establishing wireless pairing with the peripheral device in response to detecting the peripheral device. Establishing wireless pairing with the peripheral device at step 204 may include, at step 206, performing an identifier exchange with the peripheral device via the electrostatic interface. When the identifier exchange is performed, the computing device and the peripheral device may exchange information with which a locally unique wireless pairing may be specified. Thus, in examples in which the computing device is paired with a plurality of peripheral devices, the computing device and the peripheral devices may be configured to distinguish between the plurality of wireless pairings.

At step 208, step 204 may further include generating a temporary key subsequently to performing the identifier exchange. The temporary key may, for example, be a single-use 128-bit key. At step 210, step 204 may further include transmitting the temporary key to the peripheral device via the electrostatic interface.

At step 212, subsequently to transmitting the temporary key to the peripheral device, step 204 may further include receiving a first wireless pairing signal from the peripheral device via the wireless communication device. The first wireless pairing signal may be generated at the peripheral device in response to receiving the temporary key. In some examples, the first wireless pairing signal may be encrypted with the temporary key when the first wireless signal is received at the computing device. In such examples, step 204 may further include, at step 214, decrypting the first wireless pairing signal using the temporary key subsequently to receiving the first wireless pairing signal.

At step 216, step 204 may further include transmitting a second wireless pairing signal to the peripheral device via the wireless communication device subsequently to receiving the first wireless pairing signal. The second wireless pairing signal may encode a long-term key that may be used to encrypt further communications between the computing device and the peripheral device while the devices are paired. Thus, establishing the wireless pairing at step 204 may create a bonded device pair including the computing device and the peripheral device.

Figure 7B:
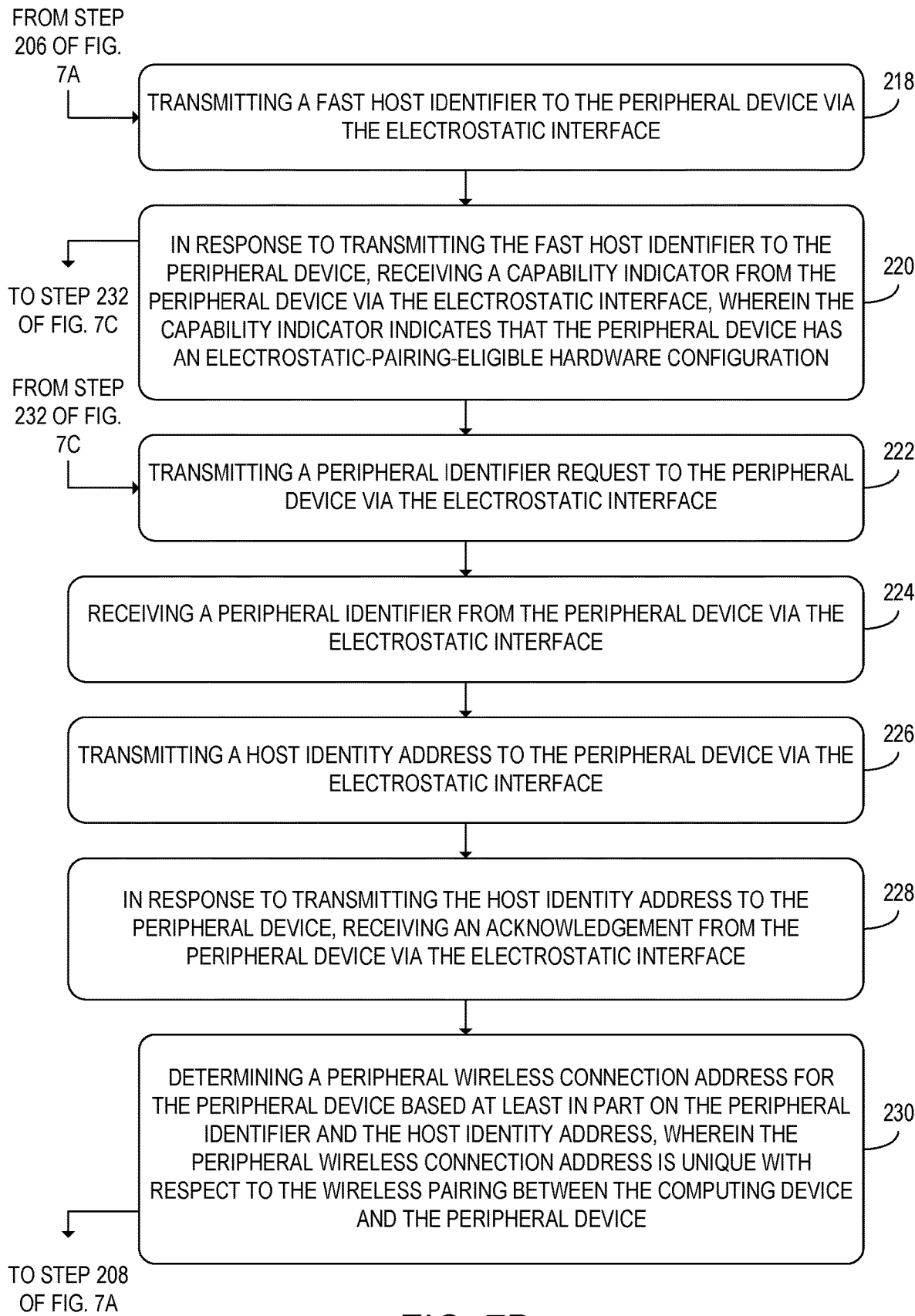
FIG. 7B shows additional steps of the method of FIG. 7A that may be performed during an identifier exchange between the computing device and the peripheral device.

FIG. 7B shows additional steps of the method 200 that may be performed when the identifier exchange is performed at step 206. At step 218, the method 200 may further include transmitting an FHID to the peripheral device via the electrostatic interface. The FHID may indicate one or more hardware capabilities of the computing device. For example, the FHID may indicate that the computing device is capable of using the electrostatic interface to establish a wireless pairing. In some examples, the FHID may further indicate one or more other hardware components or capabilities of the computing device. In examples in which step 218 is performed, the method 200 may further include, at step 220, receiving a capability indicator from the peripheral device via the electrostatic interface in response to transmitting the fast host identifier to the peripheral device. The capability indicator may indicate that the peripheral device has an electrostatic-pairing-eligible hardware configuration.

At step 222, the method 200 may further include transmitting a PID request to the peripheral device via the electrostatic interface. In response to transmitting the PID request to the peripheral device, the method 200 may further include, at step 224, receiving a PID from the peripheral device via the electrostatic interface. At step 226, the method 200 may further include transmitting an HIA associated with the computing device to the peripheral device via the electrostatic interface. The HIA may, for example, be transmitted to the peripheral device in response to receiving the PID. In some examples, the PID and the HIA may be exchanged subsequently to transmitting the FHID to the peripheral device. Alternatively, the FHID may be transmitted to the peripheral device subsequently to the exchange of the PID and the HIA.

At step 228, the method 200 may further include receiving an acknowledgement from the peripheral device via the electrostatic interface in response to transmitting the host identity address to the peripheral device. In some examples, when step 210 is performed, the temporary key may be transmitted to the peripheral device in response to receiving the acknowledgement.

The method 200 may further include, at step 230, determining a peripheral wireless connection address for the peripheral device based at least in part on the PID. The peripheral wireless connection address may also be determined based at least in part on the HIA. Thus, the peripheral wireless connection address may be unique with respect to the wireless pairing between the computing device and the peripheral device. In some examples, the peripheral device may also be configured to determine the peripheral wireless connection address based at least in part on the PID and the HIA. When the second wireless pairing signal is transmitted at step 216, the second wireless pairing signal may be transmitted to the peripheral device as specified by the peripheral wireless connection address. Thus, during the identifier exchange, the computing device and the peripheral device may generate a peripheral wireless connection address that may be unique to the wireless pairing and that may be used to convey the second wireless pairing signal to the peripheral device.

Figure 7C:
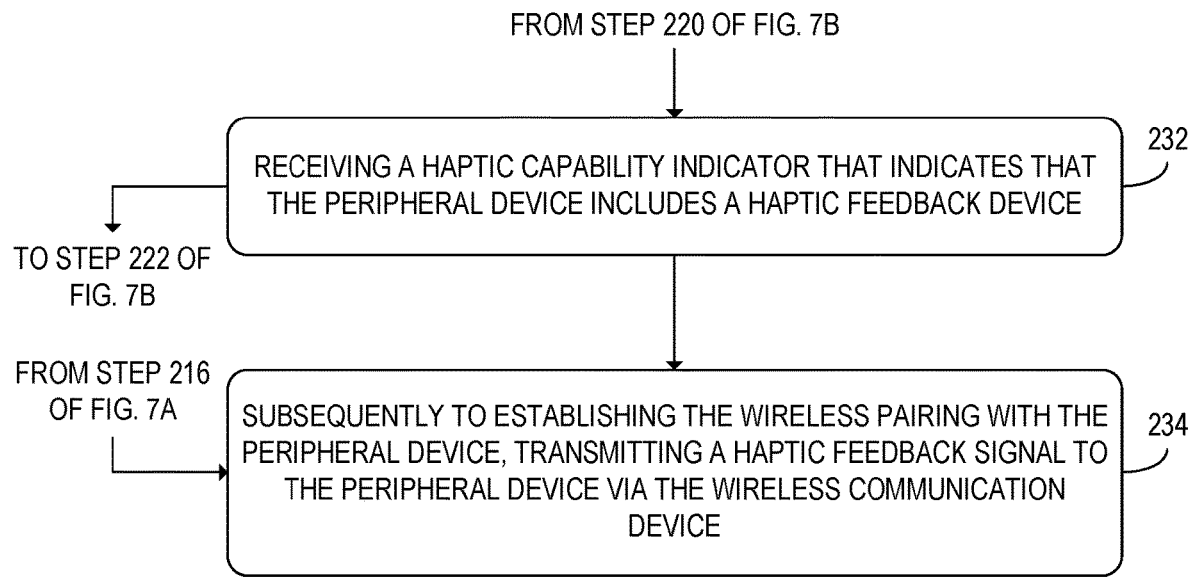
FIG. 7C shows additional steps of the method of FIG. 7A that may be performed when the peripheral device includes a haptic feedback device.

FIG. 7C shows additional steps of the method 200 that may be performed in examples in which step 220 is performed. At step 232, the method 200 may further include receiving a haptic capability indicator that indicates that the peripheral device includes a haptic feedback device. The haptic capability indicator may be included in the capability indicator that is received in response to transmitting the FHID to the peripheral device. At step 234, subsequently to establishing the wireless pairing with the peripheral device, the method 200 may further include transmitting a haptic feedback signal to the peripheral device via the wireless communication device. The wireless pairing of the computing device with the peripheral device may thereby allow the computing device to convey the haptic feedback signal to the peripheral device for output at the haptic feedback device.

Figure 8:
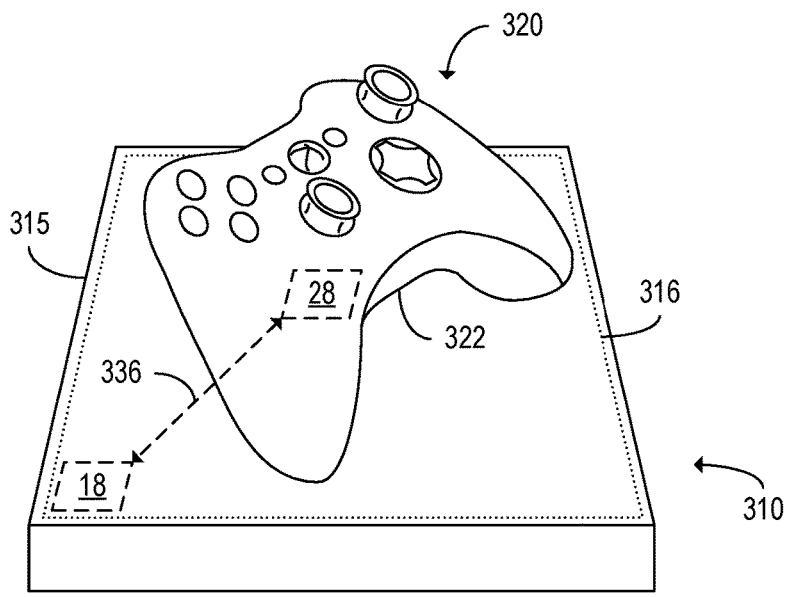
FIG. 8 shows an example computing device including an electrostatic interface provided in a charging dock for a video game controller.

In the examples provided above, the peripheral device is a pen. However, in other examples, other types of peripheral devices may be used. FIG. 8 shows an example computing device 310 in which the electrostatic interface 316 is a surface of a charging dock 315 for a video game controller 320. The computing device 310 may be configured to establish a wireless pairing 336 with the video game controller 320 such that the computing device 310 and the video game controller 320 may communicate via wireless signals transmitted between the wireless communication device 18 of the computing device 310 and the peripheral wireless communication device 28 of the video game controller 320. When an electrically conductive surface 322 included in the video game controller 320 is in contact with the electrostatic surface 316 of the computing device 310, the processor 12 of the computing device 310 and the peripheral device processor 25A of the video game controller 320 may be configured to exchange information via the electrostatic surface 316 such that the wireless pairing 336 may be established.

Using the devices and methods discussed above, wireless pairing may be established between a computing device and a peripheral device using information transmitted between the devices through an electrostatic interface. The devices and methods discussed above may allow wireless pairing to be performed more quickly and with less user intervention compared to previous methods of pairing devices. In addition, since the devices and methods discussed above may be used to form a secure connection between the computing device and the peripheral device, additional functionality may be enabled for the peripheral device that would require additional setup time to implement securely using previous device pairing methods. For example, the devices and methods discussed above may be used to implement haptic feedback at the peripheral device. Thus, the devices and methods discussed above may allow a high-functionality wireless pairing between a computing device and a peripheral device to be established during typical use of the peripheral device without the user having to perform additional setup steps.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
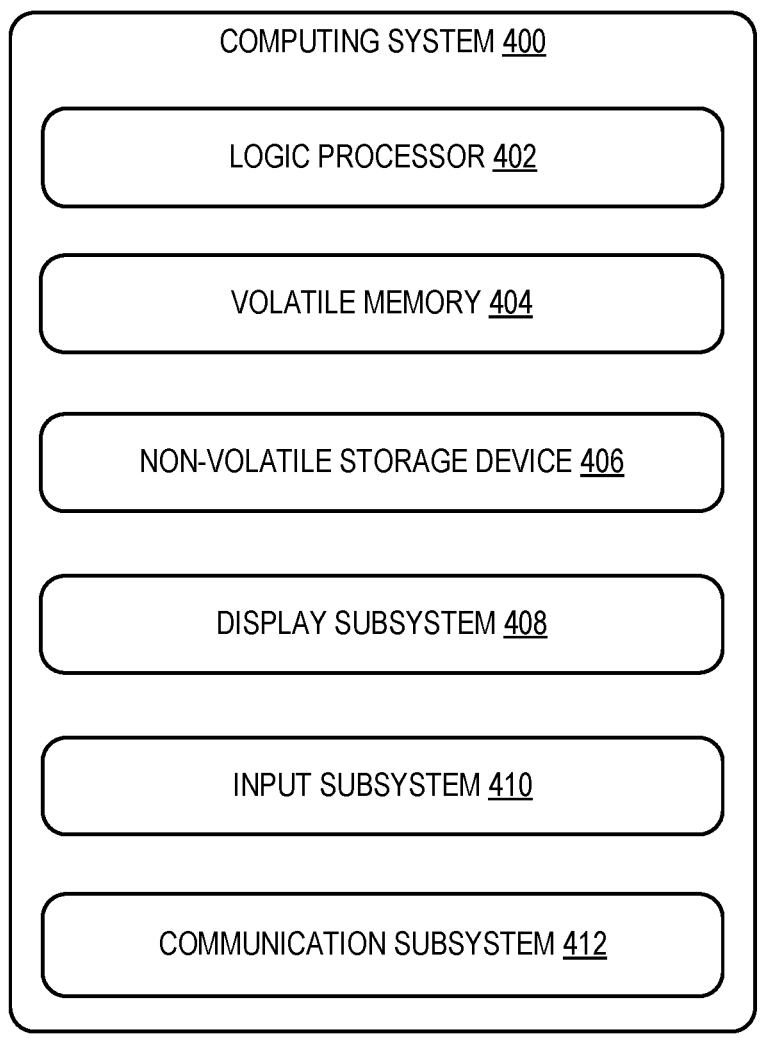
FIG. 9 shows a schematic view of an example computing environment in which the computing device of FIG. 1 may be enacted.

FIG. 9 schematically shows a non-limiting embodiment of a computing system 400 that can enact one or more of the methods and processes described above. Computing system 400 is shown in simplified form. Computing system 400 may embody the computing device 10 described above and illustrated in FIG. 1. Components of the computing system 400 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing device is provided, including a wireless communication device, an electrostatic interface located on a surface of the computing device, and a processor. The processor may be configured to, via the electrostatic interface, detect a peripheral device proximate the surface. In response to detecting the peripheral device, the processor may be further configured to establish wireless pairing with the peripheral device at least in part by performing an identifier exchange with the peripheral device via the electrostatic interface. Establishing the wireless pairing may further include, subsequently to performing the identifier exchange, generating a temporary key. Establishing the wireless pairing may further include transmitting the temporary key to the peripheral device via the electrostatic interface. Subsequently to transmitting the temporary key to the peripheral device, establishing the wireless pairing may further include receiving a first wireless pairing signal from the peripheral device via the wireless communication device. Subsequently to receiving the first wireless pairing signal, establishing the wireless pairing may further include transmitting a second wireless pairing signal to the peripheral device via the wireless communication device to thereby create a bonded device pair including the computing device and the peripheral device.

According to this aspect, the peripheral device may be a pen.

According to this aspect, the electrostatic interface may be included in a touch-sensitive user input device.

According to this aspect, the electrostatic interface may be included in a charging dock.

According to this aspect, the identifier exchange may include receiving a peripheral identifier from the peripheral device via the electrostatic interface. Establishing the wireless pairing may further include determining a peripheral wireless connection address for the peripheral device based at least in part on the peripheral identifier. The second wireless pairing signal may be transmitted to the peripheral device as specified by the peripheral wireless connection address.

According to this aspect, the identifier exchange may further include transmitting a host identity address to the peripheral device via the electrostatic interface. The identifier exchange may further include, in response to transmitting the host identity address to the peripheral device, receiving an acknowledgement from the peripheral device via the electrostatic interface. The identifier exchange may further include transmitting the temporary key to the peripheral device in response to receiving the acknowledgement.

According to this aspect, the processor may be configured to determine the peripheral wireless connection address based at least in part on the host identity address. The peripheral wireless connection address may be unique with respect to the wireless pairing between the computing device and the peripheral device.

According to this aspect, the identifier exchange may further include transmitting a fast host identifier to the peripheral device via the electrostatic interface. The identifier exchange may further include, in response to transmitting the fast host identifier to the peripheral device, receiving a capability indicator from the peripheral device via the electrostatic interface. The capability indicator may indicate that the peripheral device has an electrostatic-pairing-eligible hardware configuration. The identifier exchange may further include transmitting the host identity address to the peripheral device in response to receiving the capability indicator.

According to this aspect, the capability indicator further indicates that the peripheral device includes a haptic feedback device. Subsequently to establishing the wireless pairing with the peripheral device, the processor may be further configured to transmit a haptic feedback signal to the peripheral device via the wireless communication device.

According to this aspect, the first wireless pairing signal may be encrypted using the temporary key. Subsequently to receiving the first wireless pairing signal, the processor may be further configured to decrypt the first wireless pairing signal using the temporary key.

According to another aspect of the present disclosure, a method for use with a computing device is provided. The method may include, via an electrostatic interface located on a surface of the computing device, detecting a peripheral device proximate the surface. In response to detecting the peripheral device, the method may further include establishing wireless pairing with the peripheral device at least in part by performing an identifier exchange with the peripheral device via the electrostatic interface. Establishing the wireless pairing may further include, subsequently to performing the identifier exchange, generating a temporary key. Establishing the wireless pairing may further include transmitting the temporary key to the peripheral device via the electrostatic interface. Establishing the wireless pairing may further include, subsequently to transmitting the temporary key to the peripheral device, receiving a first wireless pairing signal from the peripheral device via the wireless communication device. Establishing the wireless pairing may further include, subsequently to receiving the first wireless pairing signal, transmitting a second wireless pairing signal to the peripheral device via the wireless communication device to thereby create a bonded device pair including the computing device and the peripheral device.

According to this aspect, the peripheral device may be a pen.

According to this aspect, the electrostatic interface may be included in a touch-sensitive user input device or a charging dock included in the computing device.

According to this aspect, performing the identifier exchange may include receiving a peripheral identifier from the peripheral device via the electrostatic interface. Establishing the wireless pairing may further include determining a peripheral wireless connection address for the peripheral device based at least in part on the peripheral identifier. The second wireless pairing signal may be transmitted to the peripheral device as specified by the peripheral wireless connection address.

According to this aspect, performing the identifier exchange may further include transmitting a host identity address to the peripheral device via the electrostatic interface. Performing the identifier exchange may further include, in response to transmitting the host identity address to the peripheral device, receiving an acknowledgement from the peripheral device via the electrostatic interface. Performing the identifier exchange may further include transmitting the temporary key to the peripheral device in response to receiving the acknowledgement.

According to this aspect, the method may further include determining the peripheral wireless connection address based at least in part on the host identity address. The peripheral wireless connection address may be unique with respect to the wireless pairing between the computing device and the peripheral device.

According to this aspect, performing the identifier exchange may further include transmitting a fast host identifier to the peripheral device via the electrostatic interface. Performing the identifier exchange may further include, in response to transmitting the fast host identifier to the peripheral device, receiving a capability indicator from the peripheral device via the electrostatic interface. The capability indicator may indicate that the peripheral device has an electrostatic-pairing-eligible hardware configuration. Performing the identifier exchange may further include transmitting the host identity address to the peripheral device in response to receiving the capability indicator.

According to this aspect, the capability indicator may further indicate that the peripheral device includes a haptic feedback device. The method may further include, subsequently to establishing the wireless pairing with the peripheral device, transmitting a haptic feedback signal to the peripheral device via the wireless communication device.

According to another aspect of the present disclosure, a peripheral computing device is provided, including a peripheral device processor configured to, while the peripheral computing device is located proximate an electrostatic interface on a surface of another computing device, establish wireless pairing with the other computing device. Establishing the wireless pairing may include performing an identifier exchange with the other computing device via the electrostatic interface. Establishing the wireless pairing may further include, subsequently to performing the identifier exchange, receiving a temporary key from the other computing device via the electrostatic interface. Establishing the wireless pairing may further include, subsequently to receiving the temporary key, transmitting a first wireless pairing signal to the other computing device via a peripheral wireless communication device included in the peripheral computing device. Establishing the wireless pairing may further include, subsequently to transmitting the first wireless pairing signal to the other computing device, receiving a second wireless pairing signal via the peripheral wireless communication device to thereby create a bonded device pair including the peripheral computing device and the other computing device.

According to this aspect, the peripheral computing device may be a pen and the electrostatic interface may be a touch-sensitive user input device.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a wireless communication device;
an electrostatic interface located on a surface of the computing device; and
a processor configured to:
via the electrostatic interface, detect a peripheral device proximate the surface; and
in response to detecting the peripheral device, establish wireless pairing with the peripheral device at least in part by:
performing an identifier exchange with the peripheral device via the electrostatic interface, wherein the identifier exchange includes:
receiving a peripheral identifier from the peripheral device via the electrostatic interface; and
transmitting a host identity address to the peripheral device via the electrostatic interface; and
in response to transmitting the host identity address to the peripheral device, receiving an acknowledgement from the peripheral device via the electrostatic interface;
subsequently to performing the identifier exchange, generating a temporary key;
transmitting the temporary key to the peripheral device via the electrostatic interface in response to receiving the acknowledgement;
determining a peripheral wireless connection address for the peripheral device based at least in part on the peripheral identifier;
subsequently to transmitting the temporary key to the peripheral device, receiving a first wireless pairing signal from the peripheral device via the wireless communication device; and
subsequently to receiving the first wireless pairing signal, transmitting a second wireless pairing signal to the peripheral device via the wireless communication device as specified by the peripheral wireless connection address to thereby create a bonded device pair including the computing device and the peripheral device.

2. The computing device of claim 1, wherein the peripheral device is a pen.

3. The computing device of claim 1, wherein the electrostatic interface is included in a touch-sensitive user input device.

4. The computing device of claim 1, wherein the electrostatic interface is included in a charging dock.

5. The computing device of claim 1, wherein:
the processor is configured to determine the peripheral wireless connection address based at least in part on the host identity address; and
the peripheral wireless connection address is unique with respect to the wireless pairing between the computing device and the peripheral device.

6. The computing device of claim 1, wherein the identifier exchange further comprises:
transmitting a fast host identifier to the peripheral device via the electrostatic interface;
in response to transmitting the fast host identifier to the peripheral device, receiving a capability indicator from the peripheral device via the electrostatic interface, wherein the capability indicator indicates that the peripheral device has an electrostatic-pairing-eligible hardware configuration; and
transmitting the host identity address to the peripheral device in response to receiving the capability indicator.

7. The computing device of claim 6, wherein:
the capability indicator further indicates that the peripheral device includes a haptic feedback device; and
subsequently to establishing the wireless pairing with the peripheral device, the processor is further configured to transmit a haptic feedback signal to the peripheral device via the wireless communication device.

8. The computing device of claim 1, wherein:
the first wireless pairing signal is encrypted using the temporary key; and
subsequently to receiving the first wireless pairing signal, the processor is further configured to decrypt the first wireless pairing signal using the temporary key.

9. A method for use with a computing device, the method comprising:
via an electrostatic interface located on a surface of the computing device, detecting a peripheral device proximate the surface; and
in response to detecting the peripheral device, establishing wireless pairing with the peripheral device at least in part by:
performing an identifier exchange with the peripheral device via the electrostatic interface, wherein the identifier exchange includes:
receiving a peripheral identifier from the peripheral device via the electrostatic interface; and
transmitting a host identity address to the peripheral device via the electrostatic interface; and
in response to transmitting the host identity address to the peripheral device, receiving an acknowledgement from the peripheral device via the electrostatic interface;
subsequently to performing the identifier exchange, generating a temporary key;
transmitting the temporary key to the peripheral device via the electrostatic interface in response to receiving the acknowledgement;
determining a peripheral wireless connection address for the peripheral device based at least in part on the peripheral identifier;
subsequently to transmitting the temporary key to the peripheral device, receiving a first wireless pairing signal from the peripheral device via the wireless communication device; and
subsequently to receiving the first wireless pairing signal, transmitting a second wireless pairing signal to the peripheral device via the wireless communication device as specified by the peripheral wireless connection address to thereby create a bonded device pair including the computing device and the peripheral device.

10. The method of claim 9, wherein the peripheral device is a pen.

11. The method of claim 9, wherein the electrostatic interface is included in a touch-sensitive user input device or a charging dock included in the computing device.

12. The method of claim 9, further comprising determining the peripheral wireless connection address based at least in part on the host identity address, wherein the peripheral wireless connection address is unique with respect to the wireless pairing between the computing device and the peripheral device.

13. The method of claim 9, wherein performing the identifier exchange further comprises:

transmitting a fast host identifier to the peripheral device via the electrostatic interface;

in response to transmitting the fast host identifier to the peripheral device, receiving a capability indicator from the peripheral device via the electrostatic interface, wherein the capability indicator indicates that the peripheral device has an electrostatic-pairing-eligible hardware configuration; and transmitting the host identity address to the peripheral device in response to receiving the capability indicator.

14. The method of claim 13, wherein:

the capability indicator further indicates that the peripheral device includes a haptic feedback device; and the method further comprises, subsequently to establishing the wireless pairing with the peripheral device, transmitting a haptic feedback signal to the peripheral device via the wireless communication device.

15. A peripheral computing device comprising:
a peripheral device processor configured to:
while the peripheral computing device is located proximate an electrostatic interface on a surface of another computing device, establish wireless pairing with the another computing device at least in part by:
performing an identifier exchange with the another computing device via the electrostatic interface, wherein the identifier exchange includes:
transmitting a peripheral identifier to the another computing device via the electrostatic interface; and
receiving a host identity address from the another computing device via the electrostatic interface; and
in response to receiving the host identity address from the another computing device, transmitting an acknowledgement to the another computing device via the electrostatic interface;
subsequently to performing the identifier exchange, receiving a temporary key from the another computing device via the electrostatic interface;
subsequently to receiving the temporary key, transmitting a first wireless pairing signal to the another computing device via a peripheral wireless communication device included in the peripheral computing device; and
subsequently to transmitting the first wireless pairing signal to the another computing device, receiving a second wireless pairing signal via the peripheral wireless communication device to thereby create a bonded device pair including the peripheral computing device and the another computing device.

16. The peripheral computing device of claim 15, wherein the peripheral computing device is a pen and the electrostatic interface is a touch-sensitive user input device.

* * * * *